(12) United States Patent
Friel

(10) Patent No.: US 7,486,701 B2
(45) Date of Patent: Feb. 3, 2009

(54) APPARATUS AND METHOD FOR AIR TRAFFIC SERVICES VOICE SIGNALING

(75) Inventor: Eamon Friel, Clarence Creek (CA)

(73) Assignee: SolaCom Technologies Inc., Gatineau, Quebec (CA)

( * ) Notice: Subject to any disclaimer, the term of this patent is extended or adjusted under 35 U.S.C. 154(b) by 738 days.

(21) Appl. No.: 11/188,376

(22) Filed: Jul. 25, 2005

(65) Prior Publication Data

US 2007/0019680 A1    Jan. 25, 2007

(51) Int. Cl.
*H04J 1/02* (2006.01)
*H04J 3/02* (2006.01)
*H04L 12/28* (2006.01)
*H04L 12/56* (2006.01)

(52) U.S. Cl. ............... 370/493; 370/537; 370/907; 370/401

(58) Field of Classification Search ........... 370/493, 370/907, 537, 541, 458, 401, 494, 495, 466, 370/467; 375/295
See application file for complete search history.

(56) References Cited

U.S. PATENT DOCUMENTS

| 4,553,129 | A | * | 11/1985 | McNesby et al. ........... 341/61 |
| 4,742,531 | A | * | 5/1988 | Blondeau et al. ........... 375/242 |
| 4,995,076 | A | * | 2/1991 | Joffe et al. ............... 379/257 |
| 6,522,688 | B1 | * | 2/2003 | Dowling ................. 375/222 |
| 6,859,453 | B1 | * | 2/2005 | Pick et al. ............... 370/358 |
| 2007/0036077 | A1 | * | 2/2007 | Boggs ................... 370/230 |

FOREIGN PATENT DOCUMENTS

| JP | 403053626 A | * | 3/1991 |
| JP | 404043730 A | * | 2/1992 |
| KR | 10-1993-0010955 | * | 7/1992 |

OTHER PUBLICATIONS

IBM TDB NA9006327: "56kbps Rate Adapter for an ISDN Primary Card", published Jun. 1, 1990.*

* cited by examiner

*Primary Examiner*—Kwang B. Yao
*Assistant Examiner*—Warner Wong
(74) *Attorney, Agent, or Firm*—Osha Liang LLP

(57) ABSTRACT

A method for encoding ATS-QSIG standard-based content for transmission over a 56 kb/s clear channel. The method encodes each of the three 16 kb/s ATS-QSIG voice sub-channels on to corresponding 16 kb/s voice sub-channels in the 56 kb/s clear channel. The method encodes the 16 kb/s ATS-QSIG data sub-channel on to a 8 kb/s data sub-channel in the 56 kb/s clear channel. Using the method, the ATS-QSIG standard can be used in a network such as, for example, the North American PSTN that utilizes 56 kb/s clear channels. In addition, a system for adapting ATS-QSIG standard-based content transmitted on a 64 kb/s clear channel for transmission on a 56 kb/s clear channel and a system for adapting ATS-QSIG standard-based content transmitted on a 56 kb/s clear channel for transmission on a 64 kb/s clear channel. The systems can be used, for example, as gateways to permit ATS-QSIG standard-based communications between 56 kb/s and 64 kb/s based networks.

25 Claims, 2 Drawing Sheets

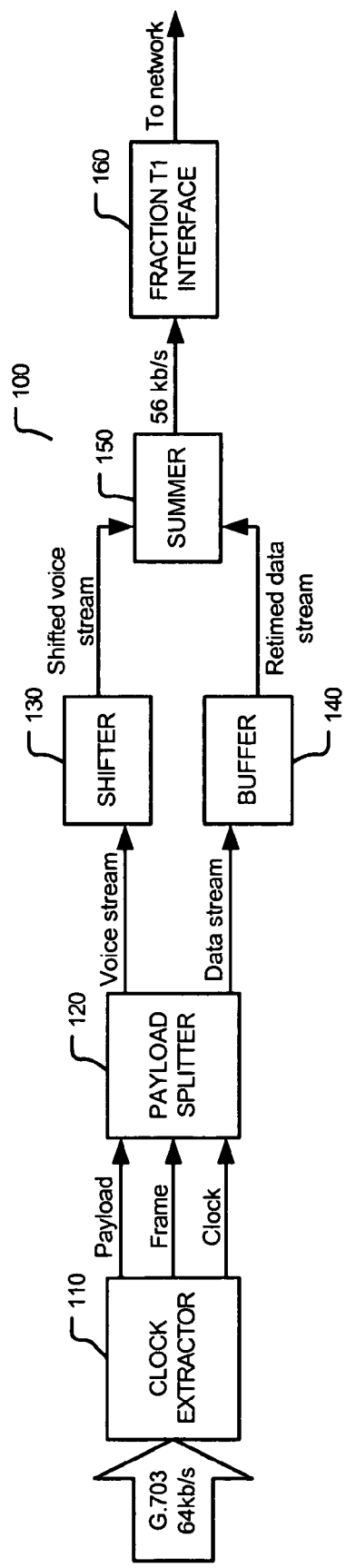
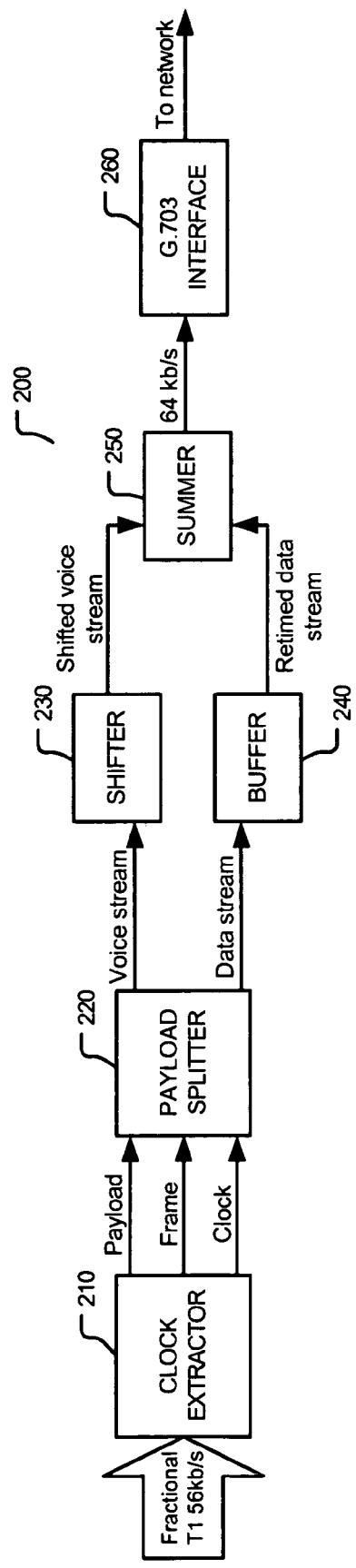
FIGURE 1
FIGURE 2

APPARATUS AND METHOD FOR AIR TRAFFIC SERVICES VOICE SIGNALING

FIELD OF THE INVENTION

The present invention relates to the field of signaling for voice communications facilities. In particular, to an apparatus and a method for air traffic services voice signaling.

BACKGROUND OF INVENTION

Air Traffic Services (ATS) have traditionally used dedicated point to point communications circuits to carry voice communications associated with the control of aircraft. In order to reduce leasing costs, the European ATS service providers (as represented, for example, by Eurocontrol) have defined a networking standard for ATS voice circuits which has been formalized in the Ecma International-European Association For Standardizing Information And Communication Systems' Standard ECMA-312 (Second Edition, June 2001) and subsequently adopted by the European Telecommunications Standards Institute (ETSI) as Standard EN 301 846. This ATS standard was also recommended by the International Civil Aviation Organization (ICAO) as a standard suitable for international use. This is addressed in ICAO Doc. 9084 AN/762, Manual on ATS Ground-Ground Voice Switching and Signaling (First Edition, 2002).

The ECMA-312 standard is based on the Integrated Services Digital Network (ISDN) PSS1 standard (also known as QSIG) and is adapted for use in Air Traffic Services. In the ATS environment, the ECMA-312 standard is known as ATS-QSIG. The physical interface defined in ECMA-312 is International Telecommunication Union —Telecommunication Standardization Sector (ITU-T) Recommendation G.703 Co-Directional Interface (CDI).

ATS-QSIG as defined in ECMA-312 requires the use of a 64 kb/s clear channel with octet integrity (D64U) as per ETSI specification ETS 300 290 (e.g. an E1 carrier channel). The ATS-QSIG 64 k/bs channel is mapped into four sub-channels of 16 kb/s each according to the mapping function ECMA-253 (ISO/IEC17310). Three of these sub-channels carry three voice signals encoded according to ITU-T Rec.G.728 at 16 kb/s. The fourth sub-channel, which also has an aggregate data rate of 16 kb/s, carries packet mode signaling information.

In general, 64 kb/s clear channels are not widely available in North America where 56 kb/s clear channels (e.g. a T1-carrier channel) are typically used. Where a 64 kb/s clear channel is available in North America, it carries a price premium and certain operational restrictions. This makes the use of ATS-QSIG unattractive for North American ATS providers. A similar situation exists in Japan where 56 kb/s clear channels are also typically used invention relates generally to.

SUMMARY OF INVENTION

A method for encoding ATS-QSIG (a.k.a. ECMA-312) standard-based content for transmission over a 56 kb/s clear channel. The method encodes each of the three 16 kb/s ATS-QSIG voice sub-channels on to corresponding 16 kb/s voice sub-channels in the 56 kb/s clear channel. The method encodes the 16 kb/s ATS-QSIG data sub-channel onto an 8 kb/s data sub-channel in the 56 kb/s clear channel. Using the method, the ATS-QSIG standard can be used in a network such as, for example, the North American public switched telephone network (PSTN) that utilizes 56 kb/s clear channels. In addition, a system for adapting ATS-QSIG standard-based content transmitted on a 64 kb/s clear channel for transmission on a 56 kb/s clear channel and a system for adapting ATS-QSIG standard-based content transmitted on a 56 kb/s clear channel for transmission on a 64 kb/s clear channel. The systems can be used, for example, as gateways to permit ATS-QSIG standard-based communications between 56 kb/s and 64 kb/s based networks.

A 56 kb/s clear channel can be carried transparently across the North American PSTN without the cost or operational penalties associated with a 64 kb/s clear channel.

In an exemplary embodiment, a system for encoding an ATS-QSIG standard-based content transmitted on a 64 kb/s clear channel, representing three voice sub-channels and one data sub-channel, onto an output stream of bytes for transmission over a 56 kb/s clear channel, the system comprising: a clock extractor receiving from the 64 kb/s clear channel and extracting an input stream of payload bytes, frame data and clock data; a payload splitter receiving the input stream, frame data and clock data from the clock extractor and separating the input stream into: a voice stream of bytes each having a group of six voice bits, two bits from each of the three voice sub-channels, per byte; and a data stream of bytes each having two data bits, from the data sub-channel, per byte; a buffer buffering the content of the data stream, placing a first data bit in a byte from the data stream into a pre-determined data-bit position in a first byte of a retimed data stream of bytes and placing a second data bit in the byte from the data stream into the pre-determined data-bit position in a second byte of the retimed data stream; a shifter shifting the group of six voice bits in a byte from the voice stream into pre-determined voice-bit positions in a byte of an shifted voice stream of bytes; and a summer summing the data bit in a byte from the retimed data stream with the group of six voice bits in a byte from the shifted voice stream to form a byte in the output stream; wherein the clock extractor, the payload splitter, the buffer, the shifter and the summer continuously interoperate to encode the content of successive bytes in the input stream onto successive bytes in the output stream at a rate of 56 kb/s.

In another exemplary embodiment, a system for encoding an ATS-QSIG standard-based content transmitted on a 56 kb/s clear channel, representing three voice sub-channels and one data sub-channel, onto an output stream of bytes for transmission over a 64 kb/s clear channel, the system comprising: a clock extractor receiving from the 56 kb/s clear channel and extracting an input stream of payload bytes, frame data and clock data; a payload splitter receiving the input stream, frame data and clock data from the clock extractor and separating the input stream into: a voice stream of bytes each having a group of six voice bits, two bits from each of the three voice sub-channels, per byte; and a data stream of bytes each having two data bits, from the data sub-channel, per byte; a buffer buffering the content of the data stream, placing a first data bit in a first byte from the data stream and a second data bit in a second byte from the data stream into pre-determined data-bit positions in a first byte of a retimed data stream of bytes; a shifter shifting the group of six voice bits in a byte from the voice stream into pre-determined voice-bit positions in a byte of an shifted voice stream of bytes; and a summer summing the first and second data bits in a byte from the retimed data stream with the group of six voice bits in a byte from the shifted voice stream to form a byte in the output stream; wherein the clock extractor, the payload splitter, the buffer, the shifter and the summer continuously interoperate to encode the content of successive bytes in the input stream onto successive bytes in the output stream at a rate of 64 kb/s.

In yet another exemplary embodiment, a method of encoding an ATS-QSIG standard-based content in an input stream of bytes, representing three voice sub-channels and one data sub-channel, onto an output stream of bytes for transmission over a 56 kb/s clear channel comprising the steps of: separating the input stream into: a voice stream of bytes each having a group of six voice bits, two bits from each of the three voice sub-channels, per byte; and a data stream of bytes each having two data bits, from the data sub-channel, per byte; buffering the content of the data stream, placing a first data bit in a byte from the data stream into a pre-determined data-bit position in a first byte of a retimed data stream of bytes and placing a second data bit in the byte from the data stream into the pre-determined data-bit position in a second byte of the retimed data stream; shifting the group of six voice bits in a byte from the voice stream into pre-determined voice-bit positions in a byte of an shifted voice stream of bytes; summing the data bit in a byte from the retimed data stream with the group of six voice bits in a byte from the shifted voice stream to form a byte in the output stream; and repeating the buffering, shifting and summing steps to continuously encode the content of successive bytes in the input stream onto successive bytes in the output stream; wherein the output stream of bytes is produced at a rate of 56 kb/s.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which:

FIG. 1 is a schematic representation of an exemplary embodiment of a system for adapting ATS-QSIG standard-based content transmitted on a 64 kb/s clear channel for transmission on a 56 kb/s clear channel.

FIG. 2 is a schematic representation of an exemplary embodiment of a system for adapting ATS-QSIG standard-based content transmitted on a 56 kb/s clear channel for transmission on a 64 kb/s clear channel.

DETAILED DESCRIPTION

Figure 3:
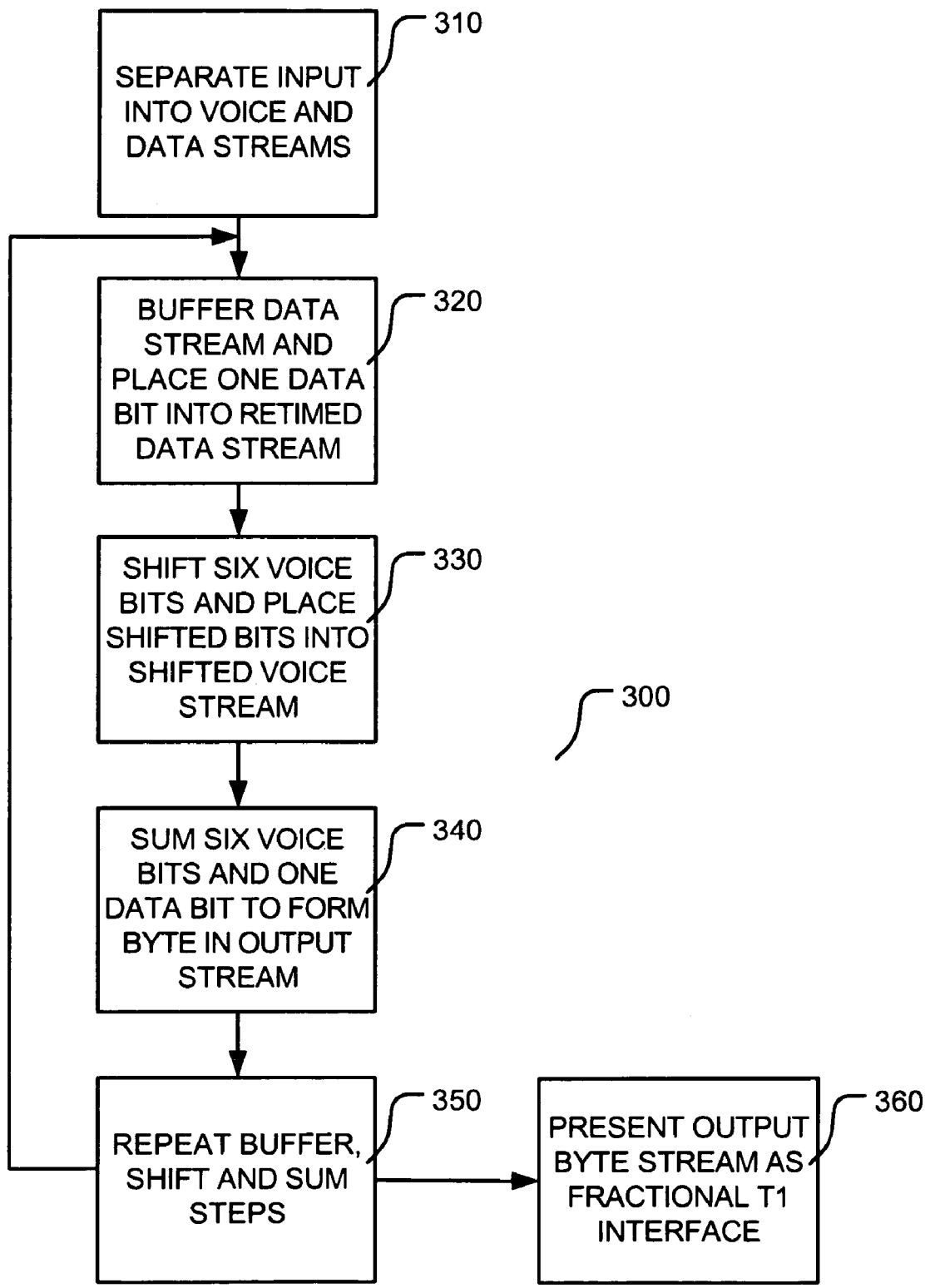
FIG. 3 is a representation of the steps in a method for encoding ATS-QSIG standard-based content for transmission over a 56 kb/s clear channel.

FIG. 1 is a schematic representation of an exemplary embodiment of a system 100 for adapting ATS-QSIG standard-based content transmitted on a 64 kb/s clear channel for transmission on a 56 kb/s clear channel.

The sub-channel mapping for ATS-QSIG as defined in ECMA-253 divides each encoded byte (octet) into four groups of two bits each. The first two bits are data sub-channel bits and the next six bits are two bits each for three voice sub-channels. Four encoded bytes are required in order to represent one byte of data or voice. For an aggregate channel rate of 64 kb/s the effective voice and data rates are 16 kb/s per sub-channel.

In the ATS-QSIG application, the data sub-channel is only used for the signaling associated with the three voice sub-channels. It is not used as an independent data bearer. The data channel thus, has excess bandwidth for its defined use.

In the North American PSTN the T1-carrier channel data rate is 64 kb/s however the eighth bit of each byte may be modified by the network, thus making it unreliable for the transmission of data. To ensure data integrity only the first seven bits of each payload byte is used to carry the information resulting in an effective 56 kb/s clear channel.

An input stream to the system 100 is provided by a 64 kb/s clear channel (e.g. an E1-carrier channel) encoded in accordance with ITU-T Rec. G.703 that includes framing and clock data. A clock extractor 110 receives the input stream. The clock extractor 110 extracts from the input stream payload bytes as well as frame and clock data. Successive payload bytes are provided at a Payload output port. The frame and clock data are provided at respective Frame and Clock output ports for synchronization of the system 100. A payload splitter 120 receives inputs corresponding to the Payload, Frame and Clock output ports of the clock extractor 110. The payload splitter 120 separates each received payload byte into a Voice output and a Data output. The first two bits of the payload byte are directed to the Data output while the remaining six bits are directed to the Voice output. A shifter 130 receives the Voice output from the payload splitter 120 and shifts the bits to occupy bit positions two through seven of a byte provided on a Shifted Voice output. A buffer 140 receives the Data output from the payload splitter 120 re-times the data bits such that a first bit of the two data bits is placed in bit position one of a first byte and a second bit of the two data bits is placed in bit position one of a second byte. The first and second bytes are provided in a Retimed Data output. A summer 150 receives the Shifted Voice output and the Retimed Data output. The summer 150 combines the received Retimed Data and Shifted Voice to form a byte in a frame containing a first bit from the Retimed Data in a first bit position followed by six bits from the Shifted Voice in second through seventh bit positions. An output from the summer 150 containing one such byte per frame forms a synchronous 56 kb/s output stream. The output stream from the summer 150 can be used to connect to a network such as, for example, the North American PSTN as a 56 kb/s clear channel or it can be received by a Fractional T1 interface 160 which provides a fractional T1 output that can be connected to a network. In an alternative embodiment the summer 150 can set the eight bit of each byte in the output stream to a predetermined value.

The bit positions within a byte (i.e. an octet) as described above and throughout this specifications are referred to as bit positions one through eight.

Referring again to FIG. 1, the Data output from the payload splitter 120 is fed to the buffer 140 that re-times the data into a Retimed Data output that the summer 150 uses to place the first data bit (from a byte of the Data output) in bit position one of a first byte of the 56 kb/s output stream and the second data bit (from a next byte of the Data output) into bit position one of a second byte of the 56 kb/s output stream and so forth until a full data sub-channel byte is encoded into eight bytes of the 56 kb/s output stream.

Not all bytes in the 16 kb/s data sub-channel of the input stream carries a significant data message. Data sub-channel bytes that are not carrying a data message are marked by an idle flag. Bytes marked with an idle flag can be discarded without negatively impacting the data integrity of the contents of the data sub-channel. The payload splitter 120 can discard bytes marked with an idle flag and thereby mitigate any backlog of data bytes from the 16 kb/s data sub-channel of the input stream queued for re-timing onto the output stream.

The buffer 140 has sufficient storage space to hold a message received on the data sub-channel having the maximum message length for an ATS-QSIG defined message. The buffer 140 can wait until the entire ATS-QSIG message is contained in the buffer 140 before beginning to provide bits in the bytes of the ATS-QSIG message to the summer 150. The entire ATS-QSIG message can be sent in contiguous bytes of the output stream. In an alternative embodiment the bytes of the ATS-QSIG message can be sent discontiguously. In another alternative embodiment, the buffer 140 can begin to provide bits of the bytes of the ATS-QSIG message to the summer 150 when a complete first byte of the message is receive from the payload splitter 120.

In typical usage, an ATS-QSIG message is not followed by another ATS-QSIG message until a response to the first message is received. Therefore, in general, when a message appears on the data sub-channel of the input stream another message does not appear immediately after the first message. In an alternative embodiment, the buffer 140 can be sized to hold a predetermined number of maximum length messages or a predetermined number of bytes based on the expected message traffic flow.

The embodiment described above with reference to FIG. 1 places a data bit in bit position one of a byte of the output stream. In an alternative embodiment any bit position in the byte, other than bit position eight, can be used for the data bit. The bit positions used for the six voice bits are adjusted accordingly to not conflict with the data bit position and not to use bit position eight.

FIG. 2 is a schematic representation of an exemplary embodiment of a system 200 for adapting ATS-QSIG standard-based content transmitted on a 56 kb/s clear channel for transmission on a 64 kb/s clear channel. An input stream to the system 200 is encoded on to a synchronous 56 kb/s clear channel that includes framing and clock data.

The sub-channel mapping for each encoded byte (octet) in the input stream is three 16 kb/s voice sub-channels and one 8 kb/s data sub-channel as described above with reference to FIG. 1 for the output stream.

A clock extractor 210 receives the input stream from a 56 kb/s source such as, for example, a T1-carrier channel. The clock extractor 210 extracts from the input stream payload bytes as well as frame and clock data. Successive payload bytes are provided at a Payload output port. The frame and clock data are provided at respective Frame and Clock output ports for synchronization of the system 200. A payload splitter 220 receives inputs corresponding to the Payload, Frame and Clock output ports of the clock extractor 210. The payload splitter 220 separates each received payload byte into a Voice output and a Data output. The first bit of the payload byte is directed to the Data output while the second through seventh bits (i.e. six bits) are directed to the Voice output. A shifter 230 receives the Voice output from the payload splitter 220 and shifts the bits to occupy bit positions three through eight of a byte provided on a Shifted Voice output. A buffer 240 receives the Data output from the payload splitter 220 and re-times the data bits such that two data bits are placed in bit positions one and two of a byte of Retimed Data output by the buffer. A first of the two data bits is from a first byte of the Data output by the payload splitter 220 while a second of the two data bits is from a second byte of the Data output of the payload splitter 220. A summer 250 receives the Shifted Voice output and the Retimed Data output. The summer 250 combines the received Retimed Data and Shifted Voice to form a byte in the output stream containing first and second data bits from the Retimed Data in a first and a second bit position, respectively, followed by six bits from the Shifted Voice in third through eight bit positions. An output from the summer 250 containing one such byte per frame forms a synchronous 64 kb/s output stream. The output stream from the summer 250 can be used to connect to a network such as, for example, a European PSTN as a synchronous 64 kb/s clear channel or it can be received by a G.703 interface 260 which provides a standard 64 kb/s Co-Directional Interface output in accordance with ITU-T Rec. G.703 that can be connected to a network.

The buffer 240 is sized to hold at least eight bits of data stream content so that an entire byte of data is available to be provided contiguously to the summer 250. In an alternative embodiment the buffer 240 can be sized to contain a maximum length ATS-QSIG message and successive bits in the bytes of the message can be provided to the summer 250 for encoding into contiguous bytes of the output stream.

The embodiment described above with reference to FIG. 2 has a data bit in bit position one of each byte of the input stream. In an alternative embodiment any bit position in bytes of the input stream, other than bit position eight, can be used for the data bit. The bit positions used for the six voice bits are adjusted accordingly to not conflict with the data bit position and not to use bit position eight.

FIG. 3 is a representation of the steps in a method for encoding ATS-QSIG standard-based content for transmission over a 56 kb/s clear channel. In step 310 an ATS-QSIG standard-based input stream is separated into a voice stream and a data stream. The voice stream is a series of bytes in which each byte contains a group of six voice bits. Each group of six voice bits comprises three sets of two voice bits; each set representing one of three 16 kb/s voice sub-channels carrying byte-wise encoded voice signals. The data stream is a series of bytes in which each byte contains two data bits representing a 16 kb/s data sub-channel carrying a byte-wise encoded, packet mode data signal. Not all bytes in the 16 kb/s data sub-channel of the input stream carries a significant data message. Data sub-channel bytes that are not carrying a data message are marked by an idle flag. Bytes marked with an idle flag can be discarded without negatively impacting the data integrity of the contents of the data sub-channel. Discarding of bytes marked with an idle flag is in according with typical ISDN packet-mode operation.

In step 320, the data stream is buffered and one bit from the two data bits in a byte from the data stream is arranged to be in bit position one of a byte in a retimed data stream. The other bit from the two data bits in the byte from the data stream is arranged to be in bit position one of successive byte in the retimed data stream. Discarding of bytes marked with an idle flag, in step 310, mitigates any backlog of bytes from the data stream queued (i.e. buffered) for re-timing onto the retimed data stream. The buffering capacity is sufficient to hold a message received on the data sub-channel having the maximum message length for an ATS-QSIG defined message. The entire ATS-QSIG message can be buffered before beginning to arrange data bits onto bytes in the retimed data stream. The entire ATS-QSIG message can be sent in contiguous bytes of the retimed data stream. In an alternative embodiment the bytes of the ATS-QSIG message can be sent discontiguously. In another alternative embodiment, data bits of the bytes of the ATS-QSIG message the buffer 240 can begin to be arranged onto bytes in the retimed data stream when a complete first byte of the message is receive from the data stream.

In step 330, the group of six bits (i.e. two bits from each of the three voice sub-channels) is shifted to be in bit positions two—seven of a byte in a shifted voice stream. In step, 340 the group of six voice bits from a byte in the shifted voice stream are summed with the data bit from a byte in the retimed data stream to form a byte in an output stream. In step 350, steps 320, 330 and 340 are repeated continuously thereby processing the ATS-QSIG standard-base input stream and generating the output stream of bytes at a rate that corresponds to 56 kb/s.

In step 350, the output stream of bytes can optionally be presented as a Fractional T1 interface to a communication network.

The embodiment described above with reference to FIG. 3 places a data bit in bit position one of a byte of the output stream. In an alternative embodiment any bit position in the byte, other than bit position eight, can be used for the data bit. The bit positions used for the six voice bits are adjusted accordingly to not conflict with the data bit position and not to use bit position eight.

It will be apparent to one skilled in the art that numerous modifications and departures from the specific embodiments described herein may be made without departing from the spirit and scope of the present invention.

What is claimed is:

1. A system for encoding an ATS-QSIG standard-based content transmitted on a 64 kb/s clear channel, representing three voice sub-channels and one data sub-channel, onto an output stream of bytes for transmission over a 56 kb/s clear channel, the system comprising:
   a clock extractor receiving from the 64 kb/s clear channel and extracting an input stream of payload bytes, frame data and clock data;
   a payload splitter receiving the input stream, frame data and clock data from the clock extractor and separating the input stream into:
      a voice stream of bytes each having a group of six voice bits, two bits from each of the three voice sub-channels, per byte; and
      a data stream of bytes each having two data bits, from the data sub-channel, per byte;
   a buffer buffering the content of the data stream, placing a first data bit in a byte from the data stream into a pre-determined data-bit position in a first byte of a retimed data stream of bytes and placing a second data bit in the byte from the data stream into the pre-determined data-bit position in a second byte of the retimed data stream;
   a shifter shifting the group of six voice bits in a byte from the voice stream into pre-determined voice-bit positions in a byte of an shifted voice stream of bytes; and
   a summer summing the data bit in a byte from the retimed data stream with the group of six voice bits in a byte from the shifted voice stream to form a byte in the output stream;
   wherein the clock extractor, the payload splitter, the buffer, the shifter and the summer continuously interoperate to encode the content of successive bytes in the input stream onto successive bytes in the output stream at a rate of 56 kb/s.

2. The system of claim 1, further comprising:
   a Fractional T1 interface, receiving the output stream, that provides a fractional T1 output that can be connected to a network.

3. The system of claim 1, wherein each of the three voice sub-channels and the data sub-channel has a data rate of 16 kb/s.

4. The system of claim 1, wherein bytes encoded in the data sub-channel can be marked with an idle indicator, the payload splitter further discarding bytes encoded in data sub-channel that are marked with an idle indicator.

5. The system of claim 1, wherein the pre-determined data-bit position is bit position one and the pre-determined voice-bit positions are bit positions two through seven.

6. The system of claim 1, wherein the pre-determined data-bit position is a bit position other than bit position eight and the pre-determined voice-bit positions are bit positions other than the data-bit position and bit position eight.

7. The system of claim 1, the summer further setting bit-position eight in the byte in the output stream to a pre-determined value.

8. The system of claim 1, the buffer further buffering at least eight data bits from the data steam before placing the first data bit into the pre-determined data-bit position in the first byte of the retimed data stream of bytes.

9. The system of claim 1, the buffer further buffering a complete ATS-QSIG message from the content of the data steam before placing the first data bit into the pre-determined data-bit position in the first byte of the retimed data stream of bytes.

10. A system for encoding an ATS-QSIG standard-based content transmitted on a 56 kb/s clear channel, representing three voice sub-channels and one data sub-channel, onto an output stream of bytes for transmission over a 64 kb/s clear channel, the system comprising:
    a clock extractor receiving from the 56 kb/s clear channel and extracting an input stream of payload bytes, frame data and clock data;
    a payload splitter receiving the input stream, frame data and clock data from the clock extractor and separating the input stream into:
       a voice stream of bytes each having a group of six voice bits, two bits from each of the three voice sub-channels, per byte; and
       a data stream of bytes each having two data bits, from the data sub-channel, per byte;
    a buffer buffering the content of the data stream, placing a first data bit in a first byte from the data stream and a second data bit in a second byte from the data stream into pre-determined data-bit positions in a first byte of a retimed data stream of bytes;
    a shifter shifting the group of six voice bits in a byte from the voice stream into pre-determined voice-bit positions in a byte of an shifted voice stream of bytes; and
    a summer summing the first and second data bits in a byte from the retimed data stream with the group of six voice bits in a byte from the shifted voice stream to form a byte in the output stream;
    wherein the clock extractor, the payload splitter, the buffer, the shifter and the summer continuously interoperate to encode the content of successive bytes in the input stream onto successive bytes in the output stream at a rate of 64 kb/s.

11. The system of claim 10, further comprising:
    a G.703 interface, receiving the output stream, that provides an ITU-T G.703 compliant output that can be connected to a network.

12. The system of claim 10, wherein each of the three voice sub-channels has a data rate of 16 kb/s and the data sub-channel has a data rate of 8 kb/s.

13. The system of claim 10, wherein bytes encoded in the data sub-channel can be marked with an idle indicator, the payload splitter further discarding bytes encoded in data sub-channel that are marked with an idle indicator.

14. The system of claim 10, wherein the pre-determined data-bit positions are bit positions one and two, and the pre-determined voice-bit positions are bit positions three through eight.

15. The system of claim 10, the buffer further buffering at least eight data bits from the data steam before placing the first data bit into the pre-determined data-bit position in the first byte of the retimed data stream of bytes.

16. The system of claim 10, the buffer further buffering a complete ATS-QSIG message from the content of the data steam before placing the first data bit into the pre-determined data-bit position in the first byte of the retimed data stream of bytes.

17. A method of encoding an ATS-QSIG standard-based content in an input stream of bytes, representing three voice sub-channels and one data sub-channel, onto an output stream of bytes for transmission over a 56 kb/s clear channel comprising the steps of:
   separating the input stream into:
      a voice stream of bytes each having a group of six voice bits, two bits from each of the three voice sub-channels, per byte; and
      a data stream of bytes each having two data bits, from the data sub-channel, per byte;
   buffering the content of the data stream, placing a first data bit in a byte from the data stream into a pre-determined data-bit position in a first byte of a retimed data stream of bytes and placing a second data bit in the byte from the data stream into the pre-determined data-bit position in a second byte of the retimed data stream;
   shifting the group of six voice bits in a byte from the voice stream into pre-determined voice-bit positions in a byte of an shifted voice stream of bytes;
   summing the data bit in a byte from the retimed data stream with the group of six voice bits in a byte from the shifted voice stream to form a byte in the output stream; and
   repeating the buffering, shifting and summing steps to continuously encode the content of successive bytes in the input stream onto successive bytes in the output stream;
   wherein the output stream of bytes is produced at a rate of 56 kb/s.

18. The method of claim 17, further comprising the step of: presenting the output stream at a fractional T1 interface.

19. The method of claim 17, wherein each of the three voice sub-channels and the data sub-channel has a data rate of 16 kb/s.

20. The method of claim 17, wherein bytes encoded in the data sub-channel can be marked with an idle indicator, the method further comprising the step of:
   discarding bytes encoded in data sub-channel that are marked with an idle indicator.

21. The method of claim 17, wherein the pre-determined data-bit position is bit position one and the pre-determined voice-bit positions are bit positions two through seven.

22. The method of claim 17, wherein the pre-determined data-bit position is a bit position other than bit position eight and the pre-determined voice-bit positions are bit positions other than the data-bit position and bit position eight.

23. The method of claim 17, the step of summing further comprising setting bit-position eight in the byte in the output stream to a pre-determined value.

24. The method of claim 17, the step of buffering further comprising buffering at least eight data bits from the data steam before placing the first data bit into the pre-determined data-bit position in the first byte of the retimed data stream of bytes.

25. The method of claim 17, the step of buffering further comprising buffering a complete ATS-QSIG message from the content of the data steam before placing the first data bit into the pre-determined data-bit position in the first byte of the retimed data stream of bytes.

* * * * *